United States Patent Office 3,598,520
Patented Aug. 10, 1971

3,598,520
SEPARATION OF RARE EARTHS
Vincent Chiola, George J. Kamin, Tai K. Kim, Robert E. Long, Jr., and Robert J. Patrician, Towanda, Pa., assignors to Sylvania Electric Products Inc.
No Drawing. Filed Sept. 16, 1969, Ser. No. 858,515
Int. Cl. C22b 59/00; C01f 17/00
U.S. Cl. 23—22     6 Claims

ABSTRACT OF THE DISCLOSURE

An improvement to the solvent extraction step of a process for the purification of rare earths comprising contacting an aqueous feed solution containing light and heavy rare earth elements with a solvent extraction solution consisting essentially of an alkyl phosphoric acid having the formula

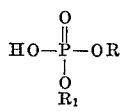

wherein R is a straight chain alkyl group having from about 8 to about 16 carbon atoms and $R_1$ is selected from hydrogen and R, an organophosphorus compound selected from the group of compounds having the formulas consisting of

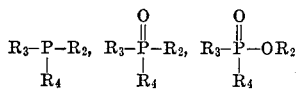

and mixtures thereof wherein $R_2$ is an alkyl group having from about 4 to about 8 carbon atoms and $R_3$ and $R_4$ are each selected from the group consisting of H, $R_2$ and $OR_2$, and a hydrocarbon solvent. The alkyl phosphoric acid is from about 3.5% to about 35% by volume of the extraction solution and the organophosporus compound is from about 2% to about 25% of the extraction solution and the remainder is the hydrocarbon solvent.

CROSS REFERENCE TO RELATED APPLICATIONS

The combination of a solvent extraction and ion exchange process for the purification and separation of yttrium as disclosed in co-pending U.S. patent application S.N. 703,027, now U.S. Pat. 3,482,932, and assigned to the same assignee as the present application enabled major improvements in the purification and separation of yttrium. It has also been shown that further improvements in rare earth separation via solvent extraction can be achieved by control of the pH and the point of recycle of an acidic scrub solution in co-pending U.S. patent application S.N. 858,340 filed concurrently herewith. Additionally, in U.S. pat. application S.N. 858,341, filed concurrently herewith, there is disclosed a continuous process that involves controlled extraction, scrubbing, washing and recycle steps that enables an appreciable increase in capacity. Each of the above applications are incorported by reference herein.

BACKGROUND OF THE INVENTION

This invention relates to an improved process for the separation and purification of rare earth elements. More particularly it relates to a process employing an improved solvent extraction solution.

Separation and purification of rare earth elements in recent years has become important from a commercial standpoint. High purity rare earth sources are required in many instances such as in the case of rare earth phosphors used in color television. Relatively large quantities of high purity rare earth elements such as yttrium and gadolinium are required to meet commercial requirements for the color television industry. As can be appreciated larger capacities and separation efficiencies are beneficial in commercial manufacturing processes.

Although the beforementioned processes and improvements have overcome many of the problems heretofore associated with rare earth purification and recovery, there is a need for a solvent extraction system that has a higher degree of flexibility, higher capacity and further increases in separation efficiency.

It is believed therefore that a process that enables the processing of rare earth sources that have large variations in rare earth content and enables large increases in rare earth feed concentrations and rare earth throughput is an advancement in the art.

SUMMARY OF THE INVENTION

In accordance with one aspect of this invention there is provided an improvement to the solvent extraction step of a process for the purification of rare earths. The improvement comprises contacting an aqueous feed solution containing light and heavy rare earth elements with a solvent extraction solution consisting essentially of an alkyl phosphoric acid having the formula

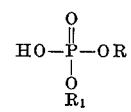  Formula 1 wherein R is a straight chain alkyl group having from about 8 to about 16 carbon atoms and $R_1$ is selected from hydrogen and R, an organophosphorus compound selected from the group of compounds having the formulas consisting of

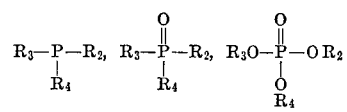

and mixtures thereof wherein $R_2$ is an alkyl group having from about 4 to about 8 carbon atoms and $R_3$ and $R_4$ are each selected from the group consisting of H, $R_2$ and $OR_2$ and a hydrocarbon solvent. The alkyl phosphoric acid is from about 3.5% to about 35% by volume of the extraction solution and the organophosphorus compound is from about 2% to about 25% of the extraction solution and the remainder is the hydrocarbon solvent.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

The alkyl phosphoric acids that are used in one of the components of this invention are those of the formula

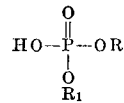

wherein R is a straight chain alkyl group containing from about 8 to about 16 carbon atoms and $R_1$ is selected from the group consisting of hydrogen and R. The mono-alkyl and di-alkyl phosphoric acids and mixture thereof can be used. Typical useful materials include but are not limited to octyl phosphoric acid, tridecyl phosphoric acid, didecyl phosphoric acid, di-tridecyl phosphoric acid and mixtures thereof.

The organophosphorus compound that can be used in the practice of this invention are those selected from the compounds of the formula

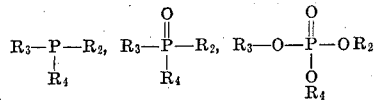

and mixtures thereof wherein $R_2$ is an alkyl group having from about 4 to about 8 carbon atoms and $R_3$ and $R_4$ are each selected from the group consisting of hydrogen, $R_2$ and $DR_2$. Typical useful materials include tri-butyl phosphine, tri-octyl phosphine, tri-n-octyl phosphine oxide, tri-amyl phosphine oxide, di-amyl, amyl phosphonate, di-octyl, oxtyl phosphonate, tri-butyl phosphate, tri-amyl phosphate and di-amyl, amyl phosphinate.

Useful solvents are those aliphatic hydrocarbon solvents that have a flash-point above about 100° F., and 100 cc. of which will dissolve at least 50 cc. of tri-decyl phosphoric acid and at least 40 cc. of tri-n-butyl phosphate and less than 3 grams of the hydrocarbon will dissolve in 100 cc. of water at 25° C. Kerosene is the preferred solvent but other primarily aliphatic hydrocarbon solvents that are water insoluble can be used.

In the prior art rare earth solvent extraction processes the organic extractant solution was normally an alkyl phosphoric acid of the type as given in Formula 1 sometimes referred to as mono and diesters of alkyl phosphor acids or mono and dialkyl esters of phosphoric acid and a solvent or carriers were used. In each instance the solvent or carrier were inert materials. Fo example, in the prior art as illustrated in U.S. Pat. 3,110,556 the extractant solution contains an alkyl phosphoric acid in a solvent such as hexane or toluene. Co-pending U.S. patent application Ser. No. 703,027 discloses the use of a solubilizer or carrier, hexanol, in addition to the solvent, kerosene, to form a three component solvent extraction system. In each instance, the components added as either solvent, carriers or solubilizers have been inert.

In the present invention the alkyl phosphoric acid and the organophosphorus compounds of the class described yield unexpected improvements because the system or solution as claimed herein yields an improvement considerably greater than solutions employing an alkyl phosphoric acid in conjunction with other solvents, carriers or solubilizers or the organophosphorus compounds in conjunction with other solvent carriers solubilizers. It is further believed surprising that improved results are obtained when an organophosphorus compound containing a short alkyl chain (4–8 carbon atoms) is combined with longer alkyl chain (8 to 16 carbon atoms) to provide the extractant solution particularly since either class of compounds when used alone yields separation results not at all comparable to the mixture.

To more fully illustrate the invention the following detailed examples are presented. All parts, proportions and percentages are by weight unless otherwise indicated.

EXAMPLE 1

An organic extraction solution consisting essentially of about 7% by volume of tridecyl phosphoric acid, about 5% tri-butyl phosphate and about 88% kerosene is prepared.

A rare earth aqueous feed solution in which about 58% of the rare earth content is yttrium and the remainder is the other light and heavy rare earths as shown below is prepared at a pH of about 1.75.

| | Percent by weight |
|---|---|
| $Y_2O_3$ | 57.9 |
| $ER_2O_3$ | 5.2 |
| $Ho_2O_3$ | 3.6 |
| $Dy_2O_3$ | 9.0 |
| $Yb_2O_3$ | 4.0 |
| $Tb_2O_3$ | 0.98 |
| $Sm_2O_3$ | 1.7 |
| $Gd_2O_3$ | 4.0 |
| $Eu_2O_3$ | 0.1 |
| $Nd_2O_3$ | 1.7 |
| $Pr_2O_3$ | 0.55 |
| $CeO_2$ | 3.5 |
| $La_2O_3$ | 2.7 |

Six samples of feed solution with concentrations varying from about 2 to about 28 grams/liter of rare earths (oxide basis) are contacted with equal volumes of the organic extraction solution.

The distribution coefficient (Kd) for yttrium and the separation factors for various rare earths compared with yttrium are determined by using standard radioisotope techniques. The following results are obtained:

TABLE 1

Organic solvent: 7% TDPA, 5% TBP, 88% kerosene.
Aqueous feed solution: pH=1.75.
Phase Ratio: 1:1 (organic:aqueous).

| Feed conc., g.REO/l. | Yttrium Kd | Separation factors Y/RE | | | |
|---|---|---|---|---|---|
| | | Ce | Nd | Gd | Dy |
| 2 | 105.5 | 23.6 | 28.3 | 7.1 | 0.8 |
| 4 | 13.91 | 139.1 | 173.9 | 30.2 | 3.1 |
| 8 | 1.52 | 190.0 | 126.7 | 30.4 | 4.3 |
| 12 | 0.81 | 101.2 | 155.0 | 27.0 | 4.8 |
| 18 | 0.40 | 133.3 | 100.0 | 40.5 | 2.1 |
| 28 | 0.27 | 90.0 | 67.5 | 27.0 | 3.8 |

Using substantially the same solvent extraction technique as in the above samples with the exception that an extraction solution as used in co-pending U.S. patent application Ser. No. 703,027 there is a sizable increase in the amount of heavy rare earths in the light fraction and light rare earths in the heavy fraction. The increase in separation achieved by the solvent extraction solution of this invention enables higher throughout and increased yields of the desired rare earth.

EXAMPLE 2

A rare earth aqueous feed solution in which about 58% of the rare earth content is yttrium and having a similar distribution of other rare earth elements as to that shown in Example 1 and having a pH of about 1.75 is contacted with various organic extraction solutions. A concentration of about 23 grams/liter of rare earths (on an oxide basis) is used. Equal volumes of extractants and feed solutions are used. The distribution coefficients and separation factors are determined from rare earth content analysis of the aqueous and organic phases. Results are shown in Table 2.

TABLE 2

Aqueous phase: 22.9 g. rare-earth oxide/liter, pH=1.90.
Organic phase: Various organophosphoric acid, tributyl phosphate (TBP), kerosene.

| Sample | Organophosphoric acid | TBP, percent | Distribution coefficient (Kd) | | Dy | Separation factor | | Comments on phase separation |
|---|---|---|---|---|---|---|---|---|
| | | | Y | Nd | | Y-Nd | Y/Dy | |
| 1 | 5% isoamyl | 2 | 0.14 | | 0.033 | | 4.35 | Poor. |
| 2 | 5% octyl | 2 | 0.35 | 0.003 | 0.14 | 118.0 | 2.50 | Excellent. |
| 3 | 5% di-2-ethylhexyl | 2 | 0.02 | 0.003 | | 6.7 | | Good. |
| 4 | 5% tridecyl | 2 | 0.18 | 0.001 | 0.076 | 182.0 | 2.4 | Excellent. |
| 5 | 7% didecyl | 5 | 0.32 | | | | | Do. |
| 6 | 7% monohexadecyl | 5 | 0.44 | | | | | Do. |
| 7 | 7% tridecyl | 5 | 0.34 | 0.004 | 0.07 | 67.5 | 3.85 | Do. |

The above data indicates that straight chain alkyl phosphoric are superior to the branch chain alkyl phosphoric acids because the solutions in which the alkyl group had branching (see Samples 1 and 3) either poor phase separation (1) or poor rare earth separation (3) occurred. Improvement in rare earth separation is achieved when the amount of alkyl phosphoric acid and organophosphorus compounds are increased (see Samples 4 and 7).

EXAMPLE 3

Using the foregoing technique various organophosphorus compounds are used in conjunction with tridecylphosphoric acid.

TABLE 3

| Sample | Organic phase | | Aqueous phase rare earth feed conc., g./l. | pH | Distribution coefficient for yttrium Kd |
|---|---|---|---|---|---|
| | Extracting agent, percent TDPA | Organophosphorus compound | | | |
| 1 | 7 | 2% dodecanol | 18 | 1.75 | 0.56 |
| 2 | 7 | 2% tributyl phosphate | 18 | 1.75 | 0.37 |
| 3 | 7 | 2% tri-n-butoxy ethylphosphate | 18 | 1.75 | 0.42 |
| 4 | 7 | 2% diamylamylphosphonate | 18 | 1.75 | 0.44 |
| 5 | 7 | 2% bis (2-ethylhexyl) 2-ethylhexylphosphonate. | 18 | 1.75 | 0.36 |
| 6 | 5 | 5% ethylhexyl alcohol | 23 | 1.90 | 0.25 |
| 7 | 5 | 5% diisobutyl carbinol | 23 | 1.90 | 0.22 |
| 8 | 5 | 5% 2,8,8 trimethyl-4-nomanol | 23 | 1.90 | 0.07 |
| 9 | 7 | 5% tributyl phosphate | 18 | 1.75 | 0.47 |
| 10 | 7 | 5% diphenylcresylphosphate | 18 | 1.75 | 0.60 |
| 11 | 7 | 5% tri-2-ethylhexyl phosphate and trioctylphosphate. | 18 | 1.75 | 0.29 |
| 12 | 7 | 5% trioctylphosphine | 18 | 1.75 | 0.37 |
| 13 | 7 | 5% tributylphosphine | 18 | 1.75 | 0.52 |

Although adequate separation occurs in all but Sample 8, inadequate phase separation or high viscosities are present in Samples 1, 6, 7, 8, 9, 11 and 12. The above characteristics indicate that the organophosphorus compounds of the present invention in conjunction with the alkyl phosphoric acids of the present invention offer distinct advantages over combinations that do not include the organophosphorus compounds.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein yttrium and heavy rare earth elements having an atomic number from 65 through 70 and light rare elements having an atomic number from 57 through 64 are separated by solvent extraction the improvement comprising contacting a feed solution containing said yttrium and heavy rare earth elements and said light rare earth elements with a three component solvent extraction solution consisting essentially of an alkyl phosphoric acid having the formula

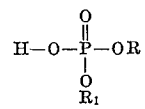

wherein R is a straight chain alkyl containing from about 8 to about 16 carbon atoms; and $R_1$ is selected from the group consisting of hydrogen and R; an organophosphorus compound selected from the group of compounds

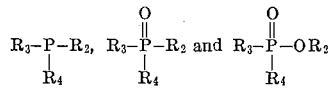

wherein $R_2$ is an alkyl group having from about 4 to about 8 carbon atoms and $R_3$ and $R_4$ are each selected from the group consisting of H, $R_2$ and $OR_2$, and an aliphatic hydrocarbon solvent, said alkyl phosphoric acid constituting from about 3.5% to about 35% by volume of said solvent extraction solution, said organophosphorus compound constituting from about 2 to about 25% by volume of said extraction solution and the remainder of said extractant solution being said hydrocarbon solvent whereby said light rare earth elements are concentrated in the aqueous phase and yttrium and said heavy rare earth elements and yttrium are concentrated in the organic phase.

2. An improvement according to claim 1 wherein said alkyl phosphoric acid is a tridecyl phosphoric acid.

3. An improvement according to claim 1 wherein said organophosphorus compound is tri-butyl phosphate.

4. A process according to claim 1 wherein said solvent is kerosene.

5. A process according to claim 1 wherein said alkyl phosphoric acid is tridecyl phosphoric acid and wherein said organophosphorus compound is tri-butyl phosphate and wherein said solvent is kerosene.

6. An improvement according to claim 5 wherein said tri-decyl phosphoric acid is from about 7% to about 28% by volume of the extractant solution and said tri-butyl phosphate content is from about 5% to about 20% by volume of said organic extractant solution.

References Cited

UNITED STATES PATENTS

| 2,859,094 | 11/1958 | Schmitt et al. | 23—312(ME) |
| 3,047,601 | 7/1962 | Johnson | 23—23X |
| 3,077,378 | 2/1962 | Peppard et al. | 23—23 |
| 3,214,239 | 10/1965 | Hazen et al. | 23—18X |
| 3,378,352 | 4/1968 | Hansen | 23—312(ME) |
| 3,482,932 | 12/1969 | Gump | 23—22 |

HERBERT T. CARTER, Primary Examiner

U.S. Cl. X.R.

23—23, 312